(12) United States Patent
Winkler et al.

(10) Patent No.: US 8,519,609 B2
(45) Date of Patent: Aug. 27, 2013

(54) PROCESS FOR THE PREPARATION OF COATED PHOSPHORS

(75) Inventors: Holger Winkler, Darmstadt (DE); Ralf Petry, Griesheim (DE); Reinhold Rueger, Roedermark (DE); Tim Vosgroene, Ober-Ramstadt (DE)

(73) Assignee: Merck Patent GmbH, Darmstadt (DE)

( * ) Notice: Subject to any disclaimer, the term of this patent is extended or adjusted under 35 U.S.C. 154(b) by 115 days.

(21) Appl. No.: 12/741,945

(22) PCT Filed: Oct. 11, 2008

(86) PCT No.: PCT/EP2008/008608
§ 371 (c)(1),
(2), (4) Date: May 7, 2010

(87) PCT Pub. No.: WO2009/059677
PCT Pub. Date: May 14, 2009

(65) Prior Publication Data
US 2010/0264809 A1    Oct. 21, 2010

(30) Foreign Application Priority Data
Nov. 8, 2007 (DE) .......................... 10 2007 053 285

(51) Int. Cl.
*H01J 1/62* (2006.01)
*C09K 11/77* (2006.01)

(52) U.S. Cl.
USPC ..... 313/483; 313/486; 313/503; 252/301.4 R; 428/403; 428/404

(58) Field of Classification Search
USPC .................. 313/485, 486, 503; 252/301.4 R
See application file for complete search history.

(56) References Cited

U.S. PATENT DOCUMENTS

| | | | |
|---|---|---|---|
| 3,886,396 A * | 5/1975 | Hammer et al. .............. | 313/486 |
| 5,156,885 A | 10/1992 | Budd | |
| 5,418,062 A | 5/1995 | Budd | |
| 5,904,995 A * | 5/1999 | Maezawa et al. ............. | 428/690 |
| 6,458,512 B1 | 10/2002 | Budd et al. | |
| 6,555,022 B2 * | 4/2003 | Hampden-Smith et al. ...................... | 252/301.4 R |
| 6,602,617 B1 * | 8/2003 | Justel et al. ................... | 428/690 |
| 7,288,889 B2 | 10/2007 | Kawamura et al. | |
| 7,511,411 B2 | 3/2009 | Maruta et al. | |
| 8,088,304 B2 * | 1/2012 | Winkler et al. ........ | 252/301.4 R |
| 2003/0230739 A1 * | 12/2003 | Comanzo et al. ...... | 252/301.4 R |
| 2004/0043692 A1 | 3/2004 | Kawamura et al. | |

(Continued)

FOREIGN PATENT DOCUMENTS

| EP | 0160856 A2 | 11/1985 |
| EP | 0160856 W | 11/1985 |

(Continued)

OTHER PUBLICATIONS

English Translation of Office Action for related Japanese Patent Application No. 2010 532460 dated Mar. 28, 2013.

(Continued)

*Primary Examiner* — Sikha Roy
(74) *Attorney, Agent, or Firm* — Millen, White, Zelano & Branigan, P.C.

(57) ABSTRACT

The invention relates to coated phosphor particles comprising luminescent particles and a, preferably substantially transparent, metal, transition-metal or semimetal oxide coating, and to a process for the production thereof.

20 Claims, 1 Drawing Sheet

(56) References Cited

U.S. PATENT DOCUMENTS

| | | |
|---|---|---|
| 2004/0061107 A1* | 4/2004 | Duggal ........................... 257/40 |
| 2004/0067355 A1* | 4/2004 | Yadav et al. .................. 428/323 |
| 2004/0101822 A1 | 5/2004 | Wiesner et al. |
| 2004/0169474 A1* | 9/2004 | Hampden-Smith et al. .. 313/582 |
| 2004/0229154 A1* | 11/2004 | Shoji et al. ................... 430/139 |
| 2005/0215419 A1* | 9/2005 | Takagimi et al. ............. 501/152 |
| 2006/0001352 A1* | 1/2006 | Maruta et al. ................. 313/486 |
| 2006/0068203 A1 | 3/2006 | Ying et al. |
| 2006/0152139 A1* | 7/2006 | Hsieh et al. ................... 313/503 |
| 2007/0125982 A1* | 6/2007 | Tian et al. ............... 252/301.4 F |
| 2007/0212541 A1 | 9/2007 | Tsukada et al. |
| 2007/0278935 A1* | 12/2007 | Harada ......................... 313/503 |
| 2010/0084962 A1 | 4/2010 | Winkler et al. |
| 2010/0283076 A1* | 11/2010 | Winkler et al. ................. 257/98 |

FOREIGN PATENT DOCUMENTS

| | | |
|---|---|---|
| EP | 0455401 B1 | 11/1991 |
| EP | 1121397 B1 | 3/2005 |
| EP | 1560274 A1 | 8/2005 |
| JP | 2003/082342 | 3/2003 |
| JP | 2003/082343 | 3/2003 |
| WO | 2007064414 A1 | 6/2007 |
| WO | WO 2007/102458 | 9/2007 |
| WO | WO 2008/107062 | 9/2008 |
| WO | PCTEP0808608 R | 12/2008 |

OTHER PUBLICATIONS

Matsushita Electric Ind Co Ltd., "Plasma Display Device," Machine Translation of Japanese Patent No. 2003 082343, Publication Date: Mar. 19, 2003; English Abstract of JP-2003 082343.

Matsushita Electric Ind Co Ltd., "Plasma Display Device," Machine Translation of Japanese Patent No. 2003 082342, Publication Date: Mar. 19, 2003; English Abstract of JP-2003 802342.

* cited by examiner

PROCESS FOR THE PREPARATION OF COATED PHOSPHORS

The invention relates to coated phosphor particles and to a process for the production thereof.

The preparation of phosphors generally requires a downstream high-temperature process. In this operation, crystallographic defects present in the phosphor matrix are, inter alia, repaired in order to maximise the crystal quality of the matrix, which is important for the phosphor performance. However, this high-temperature process inevitably results in sintering of the phosphor particle if this process is carried out at temperatures of at least ⅔ of the melting point of the phosphor. The sintering results in an unfavourable particle morphology and particle-size distribution of the phosphor powder, which has to be converted back into the primary particles by energy input (grinding) in a subsequent process step. The energy input results in surface crystal damage, such as, for example, colour centres, which impair the efficiency of the phosphor.

Surprisingly, the sintering of the phosphor particles during the high-temperature process can be avoided by coating the phosphor surface by wet-chemical methods with small particles which act as spacers between the particles and in this way function as a diffusion barrier for sintering processes. The advantage of the solution according to the invention consists in that the particle-size distribution of the phosphor particles is not changed by the high-temperature process, and complex downstream grinding processes which damage the phosphor particles are not required. Any agglomerates forming in the high-temperature process can be deagglomerated very easily, without high energy input, on use of the solution according to the invention.

EP-1 560 274 discloses a metal oxide, metal nitride or metal oxynitride coating for phosphors, where the coating is applied to the phosphors by means of CVD methods.

EP-1 121 397 B1 discloses an essentially transparent metal oxynitride coating for phosphors, where the coating is applied to the phosphors by means of CVD methods, and the phosphor particles are intended to be protected against moisture in this way.

EP-0 455 401 B2 describes encapsulated electroluminescent phosphor particles, where each particle has a phosphor based on zinc sulfide which is completely encapsulated by a substantially transparent, coherent metal oxide coating. Here too, the coating is carried out by a CVD method, and exclusively coherent coatings are formed.

CVD methods are very complex technically and in terms of equipment: very high purities of the (inert) gas atmosphere are necessary throughout the process, and the flow must be designed in such a way that homogeneous feed of the individual gas streams to the material to be coated can take place.

The present invention relates to coated phosphor particles comprising luminescent particles and a metal, transition-metal or semimetal oxide coating obtainable by mixing at least two starting materials with at least one dopant by wet-chemical methods and subsequent calcination to give phosphor precursors, and coating with metal, transition-metal or semimetal oxides by wet-chemical methods and subsequent calcination.

The metal, transition-metal or semimetal coating is preferably substantially transparent, i.e. it must ensure 90% to 100% transparency both for the excitation spectrum and also for the emission spectrum of the respective conversion phosphors employed. On the other hand, the transparency of the coating according to the invention may also be less than 90% to 100% for all wavelengths which do not correspond to the excitation and emission wavelengths.

The preparation of phosphors, for example YAG:Ce, requires at least two successive calcination steps:
1. calcination in the air at a temperature $T_1 > 150°$ C.
2. calcination in a reducing atmosphere at a temperature $T_2 > 800°$ C., preferably between 800 and 1750° C.

During the first calcination, only weak agglomeration of the primary particles occurs. Grinding and classification into the desired particle-size distribution (target fraction) can therefore take place after this step by input of only very low energies.

This target fraction of the pre-calcined phosphor particles is coated with a substantially transparent metal, transition-metal or semimetal oxide (such as, for example, aluminium oxide) in a wet-chemical process in a stirred reactor by addition of aqueous or non-aqueous solutions of the corresponding non-volatile salts and/or organometallic compounds. This is carried out by preferably depositing small islands of metal, transition-metal or semimetal oxide particles on the phosphor particles (see FIG. 1).

The surface of the coated phosphor particles thus preferably becomes porous, causing a barrier action for sintering processes. Compared with coherent coatings, as mentioned in the prior art, the porous coating has the advantage that only it enables the formation of spacers. The latter counter sintering during the high-temperature process by preventing direct contact of the phosphor surfaces between a plurality of phosphor particles. Sintering of the phosphor surfaces is thereby excluded. It is merely possible for the surfaces of the porous coatings of the phosphor particles to sinter to one another. However, these aggregates are only loosely connected to one another since the contact area is very small. These aggregates can thus be separated very easily without affecting the phosphor properties.

A further advantage of the metal, transition-metal or semimetal oxide consists in that, if chosen suitably, it does not form mixed crystals with the phosphor, giving rise to stability of the diffusion barrier over the process. Substantially transparent oxides which are employed for the coating are preferably aluminium oxide, zinc oxide, titanium dioxide, zirconium oxide or silicon oxide or combinations thereof. Aluminium oxide is particularly preferably employed.

On use, for example, of aluminium oxide as coating material, a dark coloration on the surface of the aluminium oxide particles may possibly occur during a reductive high-temperature treatment due to formation of Al suboxides. Selective oxidation of the Al suboxide to give $Al_2O_3$ by treatment of the powder at 600 to 800° C. in a steam atmosphere is then possible after the high-temperature process.

The term "porosity or porous" is taken to mean the average pore opening on the surface of a material. The coated phosphor surface according to the invention is preferably meso- or macroporous, where "mesoporous" describes a pore opening between 2 and 50 nm and "macroporous" describes a pore size >50 nm.

These porous coatings additionally offer the possibility of further reducing the refractive index of a single layer.

The particle size of the phosphors according to the invention is between 50 nm and 30 µm, preferably between 1 µm and 20 µm.

The thickness of the metal, transition-metal or semimetal oxide coating according to the invention is between 10 and 150 nm. The particle size of the primary particles of the metal, transition-metal or semimetal oxide coating is between 5 and 100 nm.

The following compounds are particularly suitable as material for the phosphor particles according to the invention: $(Y,Gd,Lu,Sc,Sm,Tb,Th,Ir,Sb,Bi)_3(Al,Ga)_5O_{12}$:Ce (with or without Pr), $YSiO_2N$:Ce, $Y_2Si_3O_3N_4$:Ce, $Gd_2Si_3O_3N_4$:Ce, $(Y,Gd,Tb,Lu)_3Al_{5-x}Si_xO_{12-x}N_x$:Ce, $BaMgAl_{10}O_{17}$:Eu (with or without Mn), $SrAl_2O_4$:Eu, $Sr_4Al_{14}O_{25}$:Eu, $(Ca,Sr,Ba)Si_2N_2O_2$:Eu, $SrSiAl_2O_3N_2$:Eu, $(Ca,Sr,Ba)_2Si_5N_8$:Eu, $(Ca,Sr,Ba)SiN_2$:Eu, $CaAlSiN_3$:Eu, molybdates, tungstates, vanadates, group III nitrides, oxides, in each case individually or mixtures thereof with one or more activator ions, such as Ce, Eu, Mn, Cr, Tb and/or Bi.

The present invention furthermore relates to a process for the production of coated phosphor particles with substantially transparent metal, transition-metal or semimetal oxides, characterised by the steps of:

a. Preparation of a pre-calcined phosphor precursor suspension by mixing at least two starting materials and at least one dopant by wet-chemical methods and thermally treating the mixture at a temperature $T_1>150°$ C.

b. Coating of the pre-calcined phosphor precursor suspension with a substantially transparent metal, transition-metal or semimetal oxide in a wet-chemical process at elevated temperature and subsequent calcination at a temperature $T_2>800°$ C.

c. Optionally additionally selective oxidation of suboxides at a temperature $T_3<800°$ C. to give the corresponding metal or semimetal oxides.

The starting materials for the preparation of the phosphor consist, as mentioned above, of the base material (for example salt solutions of aluminium, yttrium and cerium) and at least one dopant, preferably europium or cerium, and optionally further Gd-, Lu-, Sc-, Sm-, Tb-, Pr- and/or Ga-containing materials. Suitable starting materials are inorganic and/or organic substances, such as nitrates, carbonates, hydrogencarbonates, phosphates, carboxylates, alcoholates, acetates, oxalates, halides, sulfates, organometallic compounds, hydroxides and/or oxides of the metals, semimetals, transition metals and/or rare-earth metals, which are dissolved and/or suspended in inorganic and/or organic liquids. Preference is given to the use of mixed nitrate solutions, chloride or hydroxide solutions which comprise the corresponding elements in the requisite stoichiometric ratio.

Wet-chemical preparation generally has the advantage over the conventional solid-state diffusion (mixing and firing) method that the resultant materials have greater uniformity with respect to the stoichiometric composition, the particle size and the morphology of the particles from which the phosphor according to the invention is prepared.

For wet-chemical pretreatment of an aqueous precursor of the phosphors (=phosphor precursors) consisting, for example, of a mixture of yttrium nitrate, aluminium nitrate and cerium nitrate solution, the following known methods are preferred:

coprecipitation with an $NH_4HCO_3$ solution (see, for example, *Jander, Blasius Lehrbuch der analyt. u. präp. anorg. Chem. [Textbook of Analyt. and Prep. Inorg. Chem.]* 2002)

Pecchini method using a solution of citric acid and ethylene glycol (see, for example, *Annual Review of Materials Research, Vol.* 36: 2006, 281-331)

combustion method using urea spray-drying of aqueous or organic salt solutions (starting materials)

spray pyrolysis of aqueous or organic salt solutions (starting materials).

In the above-mentioned coprecipitation, which is particularly preferred in accordance with the invention, an $NH_4HCO_3$ solution is added, for example, to nitrate solutions of the corresponding phosphor starting materials, resulting in the formation of the phosphor precursor.

In the Pecchini method, a precipitation reagent consisting of citric acid and ethylene glycol is added, for example, to the above-mentioned nitrate solutions of the corresponding phosphor starting materials at room temperature, and the mixture is subsequently heated. Increasing the viscosity results in phosphor precursor formation.

In the known combustion method, the above-mentioned nitrate solutions of the corresponding phosphor starting materials are, for example, dissolved in water, then boiled under reflux and treated with urea, resulting in the slow formation of the phosphor precursor.

Spray pyrolysis is one of the aerosol methods, which are characterised by spraying solutions, suspensions or dispersions into a reaction space (reactor) heated in various ways and the formation and deposition of solid particles. In contrast to spray-drying using hot-gas temperatures <200° C., thermal decomposition of the starting materials used (for example salts) and the re-formation of substances (for example oxides, mixed oxides) additionally occur, in addition to evaporation of the solvent, in spray pyrolysis as a high-temperature process.

The above-mentioned 5 method variants are described in detail in WO 2007/004488 (Merck), which is incorporated into the context of the present application in its full scope by way of reference.

The phosphors according to the invention can be prepared by various wet-chemical methods by 1) homogeneously precipitating the constituents, then separating off the solvent, followed by a single- or multistep thermal aftertreatment, where one of these steps may be carried out in a reducing atmosphere, 2) finely dividing the mixture, for example with the aid of a spray process, and removing the solvent, followed by a single- or multistep thermal aftertreatment, where one of these steps may be carried out in a reducing atmosphere, or 3) finely dividing the mixture, for example with the aid of a spray process, and removing the solvent in association with pyrolysis, followed by a single- or multistep thermal aftertreatment, where one of these steps may be carried out in a reducing atmosphere, 4) subsequently coating the resultant phosphors with the aid of wet-chemical methods 1-3.

The wet-chemical preparation of the phosphor is preferably carried out by the precipitation and/or sol-gel method.

In the above-mentioned thermal aftertreatment, it is preferred for the calcination to be carried out at least partly under reducing conditions (for example using carbon monoxide, forming gas, pure hydrogen or at least a vacuum or oxygen-deficient atmosphere).

In general, it is also possible to prepare the phosphors according to the invention by the solid-state diffusion method, but this causes the disadvantages already mentioned.

The above-mentioned processes enable any desired outer shapes of the phosphor particles to be produced, such as spherical particles, flakes or structured materials and ceramics.

In addition, the phosphors according to the invention can be excited over a broad range, which extends from about 250 nm to 560 nm, preferably 430 nm to about 500 nm. These phosphors are thus suitable for excitation by UV or blue-emitting primary light sources, such as LEDs, or conventional discharge lamps (for example based on Hg).

The present invention furthermore relates to an illumination unit having at least one primary light source whose emission maximum or maxima is or are in the range 380 nm to 530 nm, preferably 430 nm to about 500 nm, particularly preferably in the range between 440 and 480 nm, where some or all of the primary radiation is converted into longer-wavelength radiation by the coated phosphors according to the invention. This illumination unit preferably emits white light or emits light having a certain colour point (colour-on-demand principle).

In a preferred embodiment of the illumination unit according to the invention, the light source is a luminescent indium aluminium gallium nitride, in particular of the formula $In_iGa_jAl_kN$, where $0 \leq i$, $0 \leq j$, $0 \leq k$, and $i+j+k=1$. Possible forms of light sources of this type are known to the person skilled in the art. They can be light-emitting LED chips having various structures.

In a further preferred embodiment of the illumination unit according to the invention, the light source is a luminescent arrangement based on ZnO, TCO (transparent conducting oxide), ZnSe or SiC or an arrangement based on an organic light-emitting layer (OLED).

In a further preferred embodiment of the illumination unit according to the invention, the light source is a source which exhibits electroluminescence and/or photoluminescence. The light source may furthermore also be a plasma or discharge source.

The phosphors according to the invention can either be dispersed in a resin (for example epoxy or silicone resin) or, given suitable size ratios, arranged directly on the primary light source or, depending on the application, arranged remote therefrom (the latter arrangement also includes "remote phosphor technology"). The advantages of remote phosphor technology are known to the person skilled in the art and are revealed, for example, in the following publication: Japanese Journ. of Appl. Phys. Vol. 44, No. 21 (2005), L649-L651.

In a further embodiment, it is preferred for the optical coupling of the illumination unit between the coated phosphor and the primary light source to be achieved by means of a light-conducting arrangement.

This enables the primary light source to be installed at a central location and to be optically coupled to the phosphor by means of light-conducting devices, such as, for example, light-conducting fibres. In this way, lamps matched to the illumination wishes and merely consisting of one or different phosphors, which may be arranged to form a light screen, and a light conductor, which is coupled to the primary light source, can be achieved. In this way, it is possible to position a strong primary light source at a location which is favourable for the electrical installation and to install lamps comprising phosphors which are coupled to the light conductors at any desired locations without further electrical cabling, but instead only by laying light conductors.

The present invention furthermore relates to the use of the phosphors according to the invention for partial or complete conversion of the blue or near-UV emission from a luminescent diode.

The phosphors according to the invention are furthermore preferably used for conversion of the blue or near-UV emission into visible white radiation. The phosphors according to the invention are furthermore preferably used for conversion of the primary radiation into a certain colour point by the "colour-on-demand" concept.

The present invention furthermore relates to the use of the phosphors according to the invention in electroluminescent materials, such as, for example, electroluminescent films (also known as lighting films or light films), in which, for example, zinc sulfide or zinc sulfide doped with $Mn^{2+}$, $Cu^+$ or $Ag^+$ is employed as emitter, which emit in the yellow-green region. The areas of application of the electroluminescent film are, for example, advertising, display backlighting in liquid-crystal display screens (LC displays) and thin-film transistor (TFT) displays, self-illuminating vehicle license plates, floor graphics (in combination with a crush-resistant and slip-proof laminate), in display and/or control elements, for example in automobiles, trains, ships and aircraft, or also domestic appliances, garden equipment, measuring instruments or sport and leisure equipment.

The following examples are intended to illustrate the present invention. However, they should in no way be regarded as limiting. All compounds or components which can be used in the compositions are either known and commercially available or can be synthesised by known methods. The temperatures indicated in the examples are always given in ° C. It furthermore goes without saying that, both in the description and also in the examples, the added amounts of the components in the compositions always add up to a total of 100%. Percentage data given should always be regarded in the given connection. However, they usually always relate to the weight of the part-amount or total amount indicated.

EXAMPLES

Example 1

Preparation of an Alumina-Coated YAG:Ce 410.423 g of aluminium chloride hexahydrate (1.70 mol), 300.140 g of yttrium chloride hexahydrate (0.98 mol) and 10.850 g of cerium chloride hexahydrate (0.03 mol) are dissolved in 800 ml of deionised water. This solution is added dropwise over the course of 1½ hours with stirring to a freshly prepared solution of 1075.2 g of ammonium hydrogencarbonate in 2 l of deionised water. The mixture is subsequently stirred for a further 30 min. The precipitate is filtered off and dried at 120° C. The material is then pre-calcined at 1000° C. over a period of 4 h in an air atmosphere.

50 g of pre-calcined YAG:Ce are suspended in 950 g of deionised water in a glass reactor with heating mantle. 600 g of an aqueous solution which comprises 98.7 g of $AlCl_3*6H_2O$ per kg of solution are metered into the suspension over the course of 2½ hours at 80° C. with stirring. During this addition, the pH is kept constant at 6.5 by metered addition of sodium hydroxide solution. When the metered addition is complete, the mixture is stirred at 80° C. for a further 1 hour, then cooled to room temperature, and the phosphor is filtered off, washed with water and dried. Finally, the dried phosphor is calcined at 750° C. for 30 min and finally sieved through a 50µ sieve.

The product is then transferred to further processing, i.e. high-temperature calcination at 1700° C. in a 20% $H_2$ atmosphere.

If the material then obtained exhibits greying (formation of aluminium suboxide, see above), it is treated in an unsaturated steam atmosphere in an oven at a temperature between 600° C. and 800° C. over a period of 2 h.

Example 2

Preparation of a Zirconium Dioxide-Coated YAG:Ce 410.423 g of aluminium chloride hexahydrate (1.70 mol), 300.140 g of yttrium chloride hexahydrate (0.98 mol) and 10.850 g of cerium chloride hexahydrate (0.03 mol) are dissolved in 800 ml of deionised water. This solution is added dropwise over the course of 1½ hours with stirring to a freshly prepared solution of 1075.2 g of ammonium hydrogencarbonate in 2 l of deionised water. The mixture is subsequently stirred for a further 30 min. The precipitate is filtered off and dried at 120° C. The material is then pre-calcined at 1000° C. over a period of 4 h in an air atmosphere.

100 g of the pre-calcined YAG:Ce phosphor are suspended in 2 l of deionised water, and the suspension is stirred at 1000 rpm. The suspension is subsequently brought to a temperature of 75° C. by means of a thermostat. A 10% by weight zirconium oxychloride solution ($ZrOCl_2$ solution) is then metered into the initially introduced suspension at a metering rate of 2 ml/min. During this operation, the pH of the suspension is kept constant at pH=3.5 by countertitration with a 30% sodium hydroxide solution. When the addition is complete, the coated phosphor is filtered off and washed with deionised water until salt-free. Finally, the dried phosphor is calcined at 750° C. for 30 min and sieved through a 20 μm sieve.

The product is then transferred to further processing, the second high-temperature calcination step.

Example 3

Preparation of a Titanium Dioxide-Coated YAG:Ce 410.423 g of aluminium chloride hexahydrate (1.70 mol), 300.140 g of yttrium chloride hexahydrate (0.98 mol) and 10.850 g of cerium chloride hexahydrate (0.03 mol) are dissolved in 800 ml of deionised water. This solution is added dropwise over the course of 1½ hours with stirring to a freshly prepared solution of 1075.2 g of ammonium hydrogencarbonate in 2 l of deionised water. The mixture is subsequently stirred for a further 30 min. The precipitate is filtered off and dried at 120° C. The material is then pre-calcined at 1000° C. over a period of 4 h in an air atmosphere.

100 g of the YAG:Ce present are suspended in 2 l of deionised water, and the suspension is stirred at 1000 rpm. The suspension is subsequently brought to a temperature of 75° C. by means of a thermostat. A 30% by weight titanium oxychloride solution ($TiOCl_2$ solution) is then metered into the initially introduced suspension at a metering rate of 2 ml/min. During this operation, the pH of the suspension is kept constant at pH=2.2 by countertitration with a 30% sodium hydroxide solution. When the addition is complete, the suspension is adjusted to pH=5.0, and the coated phosphor is filtered off and washed with deionised water until salt-free. Finally, the dried phosphor is calcined at 800° C. for 30 min and sieved through a 20 μm sieve.

The product is then transferred to further processing, i.e. high-temperature calcination in an oxidative or protective-gas atmosphere. In the case of a grey coloration (titanium suboxide formation) after the high-temperature calcination, the material is treated in steam at elevated temperature (600° C.-800° C.) for two hours, causing the disappearance of the grey coloration and the formation of titanium dioxide.

Example 4

Preparation of a Zinc Oxide-Coated YAG:Ce 410.423 g of aluminium chloride hexahydrate (1.70 mol), 300.140 g of yttrium chloride hexahydrate (0.98 mol) and 10.850 g of cerium chloride hexahydrate (0.03 mol) are dissolved in 800 ml of deionised water. This solution is added dropwise over the course of 1½ hours with stirring to a freshly prepared solution of 1075.2 g of ammonium hydrogencarbonate in 2 l of deionised water. The mixture is subsequently stirred for a further 30 min. The precipitate is filtered off and dried at 120° C. The material is then pre-calcined at 1000° C. over a period of 4 h in an air atmosphere.

100 g of the YAG:Ce phosphor present are suspended in 2 l of deionised water, and the suspension is stirred at 1000 rpm. The suspension is subsequently brought to a temperature of 75° C. by means of a thermostat. A zinc chloride solution ($ZnCl_2$ solution)—22.7 g of zinc chloride dissolved in 400 g of deionised water together with 1.0 g of aluminium chloride hexahydrate—is then metered into the initially introduced suspension at a metering rate of 5 ml/min. During this operation, the pH of the suspension is kept constant at pH=8.0 by countertitration with a 15% sodium hydroxyide solution. When the addition is complete, the suspension is adjusted to pH=5 by addition of 10% HCl solution. The coated phosphor is then filtered off and washed with deionised water until salt-free and subsequently dried. The material is then calcined at 500° C. and sieved through a 20 μm sieve.

The product is then transferred to further processing, i.e. high-temperature calcination at 1700° C. in a 20% $H_2$ atmosphere.

Example 5

Preparation of an Aluminium Oxide-Coated (Ca,Sr,Ba)$SiN_2$:Eu 50 g of (Ca,Sr,Ba)$SiN_2$:Eu are suspended in 950 g of deionised water in a glass reactor with heating mantle. 600 g of an aqueous solution which comprises 98.7 g of $AlCl_3*6H_2O$ per kg of solution are metered into the suspension over the course of 2½ hours at 80° C. with stirring. During this addition, the pH is kept constant at 6.5 by metered addition of sodium hydroxide solution. When the metered addition is complete, the mixture is stirred at 80° C. for a further 1 hour, then cooled to room temperature, and the phosphor is filtered off, washed with water and dried. Finally, the dried phosphor is calcined at 750° C. for 30 min and finally sieved through a 50μ sieve.

Example 6

Preparation of an Aluminium Oxide-Coated (Ca,Sr,Ba)$_2Si_2N_5$:Eu 50 g of (Ca,Sr,Ba)$_2Si_2N_5$:Eu are suspended in 950 g of deionised water in a glass reactor with heating mantle. 600 g of an aqueous solution which comprises 98.7 g of $AlCl_3*6H_2O$ per kg of solution are metered into the suspension over the course of 2½ hours at 80° C. with stirring. During this addition, the pH is kept constant at 6.5 by metered addition of sodium hydroxide solution. When the metered addition is complete, the mixture is stirred at 80° C. for a further 1 hour, then cooled to room temperature, and the phosphor is filtered off, washed with water and dried. Finally, the dried phosphor is calcined at 750° C. for 30 min and finally sieved through a 50μ sieve.

Example 7

Preparation of a Zirconium Oxide-Coated (Ca,Sr,Ba)$SiN_2$:Eu 100 g of (Ca,Sr,Ba)$SiN_2$:Eu are suspended in 2 l of deionised water, and the suspension is stirred at 1000 rpm. The suspension is subsequently brought to a temperature of 75° C. by means of a thermostat. A 10% by weight zirconium oxychloride solution ($ZrOCl_2$ solution) is then metered into the initially introduced suspension at a metering rate of 2 ml/min. During this operation, the pH of the suspension is kept constant at pH=3.5 by countertitration with a 30% sodium hydroxide solution. When the addition is complete, the coated phosphor is filtered off and washed with deionised water until salt-free. Finally, the dried phosphor is calcined at 750° C. for 30 min and sieved through a 20 μm sieve.

Example 8

Preparation of a Zirconium Oxide-Coated (Ca,Sr,Ba)Si$_2$N$_5$:Eu 100 g of (Ca,Sr,Ba)Si$_2$N$_5$:Eu are suspended in 2 l of deionised water, and the suspension is stirred at 1000 rpm. The suspension is subsequently brought to a temperature of 75° C. by means of a thermostat. A 10% by weight zirconium oxychloride solution (ZrOCl$_2$ solution) is then metered into the initially introduced suspension at a metering rate of 2 ml/min. During this operation, the pH of the suspension is kept constant at pH=3.5 by countertitration with a 30% sodium hydroxide solution. When the addition is complete, the coated phosphor is filtered off and washed with deionised water until salt-free. Finally, the dried phosphor is calcined at 750° C. for 30 min and sieved through a 20 μm sieve.

Example 9

Preparation of a Titanium Dioxide-Coated (Ca,Sr,Ba)SiN$_2$:Eu 100 g of (Ca,Sr,Ba)SiN$_2$:Eu are suspended in 2 l of deionised water, and the suspension is stirred at 1000 rpm. The suspension is subsequently brought to a temperature of 75° C. by means of a thermostat. A 30% by weight titanium oxychloride solution (TiOCl$_2$ solution) is then metered into, the initially introduced suspension at a metering rate of 2 ml/min. During this operation, the pH of the suspension is kept constant at pH=2.2 by countertitration with a 30% sodium hydroxide solution. When the addition is complete, the suspension is adjusted to pH=5.0, and the coated phosphor is filtered off and washed with deionised water until salt-free. Finally, the dried phosphor is calcined at 800° C. for 30 min and sieved through a 20 μm sieve.

Example 10

Preparation of a Titanium Oxide-Coated (Ca,Sr,Ba)Si$_2$N$_5$:Eu 100 g of (Ca,Sr,Ba)Si$_2$N$_5$:Eu are suspended in 2 l of deionised water, and the suspension is stirred at 1000 rpm. The suspension is subsequently brought to a temperature of 75° C. by means of a thermostat. A 30% by weight titanium oxychloride solution (TiOCl$_2$ solution) is then metered into the initially introduced suspension at a metering rate of 2 ml/min. During this operation, the pH of the suspension is kept constant at pH=2.2 by countertitration with a 30% sodium hydroxide solution. When the addition is complete, the suspension is adjusted to pH=5.0, and the coated phosphor is filtered off and washed with deionised water until salt-free. Finally, the dried phosphor is calcined at 800° C. for 30 min and sieved through a 20 μm sieve.

Example 11

Preparation of a Zinc Oxide-Coated (Ca,Sr,Ba)SiN$_2$:Eu 100 g of (Ca,Sr,Ba)SiN$_2$:Eu are suspended in 2 l of deionised water, and the suspension is stirred at 1000 rpm. The suspension is subsequently brought to a temperature of 75° C. by means of a thermostat. A zinc chloride solution (ZnCl$_2$ solution)—22.7 g of zinc chloride dissolved in 400 g of deionised water together with 1.0 g of aluminium chloride hexahydrate—is then metered into the initially introduced suspension at a metering rate of 5 ml/min. During this operation, the pH of the suspension is kept constant at pH=8.0 by countertitration with a 15% sodium hydroxide solution. When the addition is complete, the suspension is adjusted to pH=5 by addition of 10% HCl solution. The coated phosphor is then filtered off and washed with deionised water until salt-free and subsequently dried. The material is then calcined at 500° C. and sieved through a 20 μm sieve.

Example 12

Preparation of a Zinc Oxide-Coated (Ca,Sr,Ba)Si$_2$N$_5$:Eu 100 g of (Ca,Sr,Ba)Si$_2$N$_5$:Eu are suspended in 2 l of deionised water, and the suspension is stirred at 1000 rpm. The suspension is subsequently brought to a temperature of 75° C. by means of a thermostat. A zinc chloride solution (ZnCl$_2$ solution)—22.7 g of zinc chloride dissolved in 400 g of deionised water together with 1.0 g of aluminium chloride hexahydrate—is then metered into the initially introduced suspension at a metering rate of 5 ml/min. During this operation, the pH of the suspension is kept constant at pH=8.0 by countertitration with a 15% sodium hydroxide solution. When the addition is complete, the suspension is adjusted to pH=5 by addition of 10% HCl solution. The coated phosphor is then filtered off and washed with deionised water until salt-free and subsequently dried. The material is then calcined at 500° C. and sieved through a 20 μm sieve.

Example 13

Preparation of an SiO$_2$-Coated (Ca,Sr,Ba)SiN$_2$:Eu 50 g of (Ca,Sr,Ba)SiN$_2$:Eu are suspended in 1 liter of ethanol in a 2 l reactor with ground-glass lid, heating mantle and reflux condenser. A solution of 17 g of ammonia water (25% by weight of NH$_3$) in 170 g of water is added. A solution of 48 g of tetraethyl orthosilicate (TEOS) in 48 g of anhydrous ethanol is slowly added dropwise (about 1 ml/min) at 65° C. with stirring. When the addition is complete, the suspension is stirred for a further 2 hours, brought to room temperature and filtered. The residue is washed with ethanol, dried, subsequently calcined and sieved.

Example 14

Preparation of an SiO$_2$-Coated (Ca,Sr,Ba)Si$_2$N$_5$:Eu 50 g of (Ca,Sr,Ba)Si$_2$N$_5$:Eu are suspended in 1 liter of ethanol in a 2 l reactor with ground-glass lid, heating mantle and reflux condenser. A solution of 17 g of ammonia water (25% by weight of NH$_3$) in 170 g of water is added. A solution of 48 g of tetraethyl orthosilicate (TEOS) in 48 g of anhydrous ethanol is slowly added dropwise (about 1 ml/min) at 65° C.

with stirring. When the addition is complete, the suspension is stirred for a further 2 hours, brought to room temperature and filtered. The residue is washed with ethanol, dried, subsequently calcined and sieved.

DESCRIPTION OF THE FIGURES

The invention will be explained in greater detail below with reference to a working example.

Figure 1:
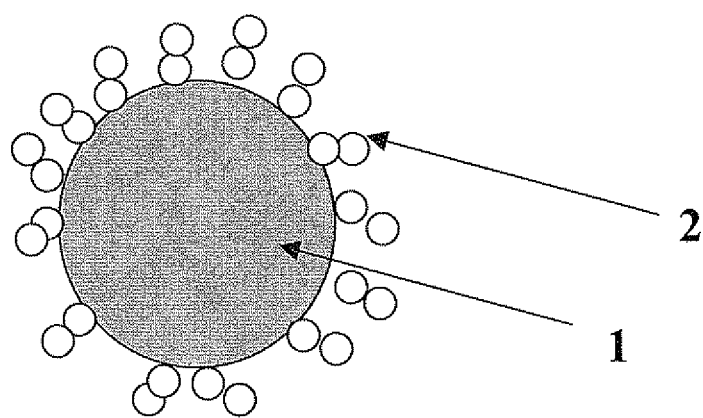
FIG. 1: shows the spacer action of the $Al_2O_3$ surface coating
1 shows a pre-calcined YAG phosphor particle
2 shows the $Al_2O_3$ coating
Figure 2:
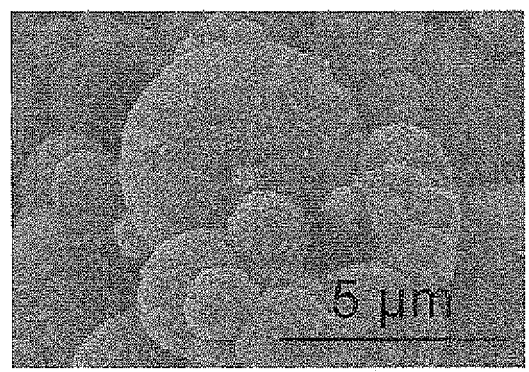
FIG. 2: shows an SEM photograph of particles coated with $Al_2O_3$ spacers.

The invention claimed is:

1. Coated phosphor particles comprising luminescent particles and a metal, transition-metal or semimetal oxide coating obtainable by mixing at least two starting materials with at least one dopant by wet-chemical methods and subsequent calcination to give phosphor precursors, and coating with metal, transition-metal or semimetal oxides by wet-chemical methods and subsequent calcination, wherein the surface of the coated phosphor particles is macroporous.

2. Coated phosphor particles according to claim 1, where each of the coated particles comprises a luminescent particle comprising at least one luminescent compound that is (Y,Gd,Lu,Sc,Sm,Tb)$_3$(Al,Ga)$_5$O$_{12}$:Ce (with or without Pr), YSiO$_2$N:Ce, Y$_2$Si$_3$O$_3$N$_4$:Ce, Gd$_2$Si$_3$O$_3$N$_4$:Ce, (Y,Gd,Tb,Lu)$_3$Al$_{5-x}$Si$_x$O$_{12-x}$N$_x$:Ce, BaMgAl$_{10}$O$_{17}$:Eu (with or without Mn), SrAl$_2$O$_4$:Eu, Sr$_4$Al$_{14}$O$_{25}$:Eu, (Ca,Sr,Ba)Si$_2$N$_2$O$_2$:Eu, SrSiAl$_2$O$_3$N$_2$:Eu, (Ca,Sr,Ba)$_2$Si$_5$N$_8$:Eu, (Ca,Sr,Ba)SiN$_2$:Eu, CaAlSiN$_3$:Eu, molybdates, tungstates, vanadates, group III nitrides or oxides, or mixtures thereof with one or more activator ions.

3. Coated phosphor particles according to claim 2, wherein the activator ions are Ce, Eu, Mn, Cr, Tb and/or Bi.

4. Coated phosphor particles according to claim 1, wherein the metal, transition-metal or semimetal oxide coating is substantially transparent.

5. A process for the production of coated phosphor particles according to claim 1, with substantially transparent metal, transition-metal or semimetal oxides, comprising:
   a. preparation of a pre-calcined phosphor precursor suspension by mixing at least two starting materials and at least one dopant by wet-chemical methods and thermally treating the mixture at a temperature $T_1 > 150°$ C.
   b. coating of the pre-calcined phosphor precursor suspension with a substantially transparent metal, transition-metal or semimetal oxide in a wet-chemical process at elevated temperature and subsequent calcination at a temperature $T_2 > 800°$ C.
   c. optionally additionally selective oxidation of suboxides at a temperature $T_3 < 800°$ C. to give the corresponding metal or semimetal oxides.

6. The process according to claim 5, wherein the substantially transparent metal, transition-metal or semimetal oxide employed is nanoparticles of aluminium oxide, zirconium oxide, zinc oxide, titanium oxide, silicon oxide or combinations thereof.

7. The process according to claim 5, wherein the substantially transparent metal, transition-metal or semimetal oxide employed is nanoparticles of aluminium oxide.

8. The process according to claim 5, wherein the phosphor precursor is prepared by wet-chemical methods from organic and/or inorganic metal, semimetal, transition-metal and/or rare-earth metal salts by means of sol-gel processes and/or precipitation processes.

9. The process according to claim 5, wherein the wet-chemical preparation of the phosphor precursors is one of the following 5 methods:
   coprecipitation with an NH$_4$HCO$_3$ solution
   Pecchini method using a solution of citric acid and ethylene glycol
   combustion method using urea
   spray-drying of dispersed starting materials or
   spray pyrolysis of dispersed starting materials.

10. The process according to claim 9, wherein the wet-chemical preparation of the phosphor precursors is carried out by means of coprecipitation with an NH$_4$HCO$_3$ solution.

11. The process according to claim 5, wherein the coating is carried out with at least one metal, transition-metal or semimetal oxide by addition of aqueous or non-aqueous solutions of non-volatile salts and/or organometallic compounds.

12. The process according to claim 5, wherein the starting materials and the dopant are inorganic and/or organic substances, and are nitrates, carbonates, hydrogencarbonates, phosphates, carboxylates, alcoholates, acetates, oxalates, halides, sulfates, organometallic compounds, hydroxides and/or oxides of the metals, semimetals, transition metals and/or rare-earth metals, which are dissolved and/or suspended in inorganic and/or organic liquids.

13. The process according to claim 5, wherein the phosphor particles consist of at least one of the following phosphor materials: (Y,Gd,Lu,Sc,Sm,Tb,Th,Ir,Sb,Bi)$_3$(Al,Ga)$_5$O$_{12}$:Ce (with or without Pr), YSiO$_2$N:Ce, Y$_2$Si$_3$O$_3$N$_4$:Ce, Gd$_2$Si$_3$O$_3$N$_4$:Ce, (Y,Gd,Tb,Lu)$_3$Al$_{5-x}$Si$_x$O$_{12-x}$N$_x$:Ce, BaMgAl$_{10}$O$_{17}$:Eu (with or without Mn), SrAl$_2$O$_4$:Eu, Sr$_4$Al$_{14}$O$_{25}$:Eu, (Ca,Sr,Ba)Si$_2$N$_2$O$_2$:Eu, SrSiAl$_2$O$_3$N$_2$:Eu, (Ca,Sr,Ba)$_2$Si$_5$N$_8$:Eu, (Ca,Sr,Ba)SiN$_2$:Eu, CaAlSiN$_3$:Eu, molybdates, tungstates, vanadates, group III nitrides, oxides, in each case individually or mixtures thereof with one or more activator ions.

14. An illumination unit having at least one primary light source whose emission maximum is in the range 380 nm to 530 nm, where some or all of this radiation is converted into longer-wavelength radiation by coated phosphor particles according to claim 1.

15. The illumination unit according to claim 14, wherein the light source is a luminescent indium aluminium gallium nitride, of the formula In$_i$Ga$_j$Al$_k$N, where $0 \leq i$, $0 \leq j$, $0 \leq k$, and $i+j+k=1$.

16. The illumination unit according to claim 14, wherein the light source is a luminescent compound based on ZnO, TCO (transparent conducting oxide), ZnSe or SiC.

17. The illumination unit according to claim 14, wherein the light source is a material based on an organic light-emitting layer.

18. The illumination unit according to claim 14, wherein the light source is a source which exhibits electroluminescence and/or photoluminescence.

19. The illumination unit according to claim 14, wherein the light source is a plasma or discharge source.

20. A method for the partial or complete conversion of blue or near-UV emission from a luminescent diode comprising using coated phosphor particles according to claim 1.

* * * * *